US011118809B2

(12) United States Patent
Yang et al.

(10) Patent No.: US 11,118,809 B2
(45) Date of Patent: Sep. 14, 2021

(54) DRAIN HOSE AND AIR CONDITIONER INCLUDING THE SAME

(71) Applicant: Samsung Electronics Co., Ltd., Suwon-si (KR)

(72) Inventors: Jae-Hyuk Yang, Suwon-si (KR); Jae Min Ahn, Gwangju (KR); Seung Min Koo, Suwon-si (KR); Byung Yul So, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 14 days.

(21) Appl. No.: 16/059,516

(22) Filed: Aug. 9, 2018

(65) Prior Publication Data

US 2018/0347851 A1 Dec. 6, 2018

Related U.S. Application Data (63) Continuation of application No. 15/191,483, filed on Jun. 23, 2016, now Pat. No. 10,107,519.

(30) Foreign Application Priority Data

Jun. 23, 2015 (KR) .......................... 10-2015-0089041

(51) Int. Cl.
| | | |
|---|---|---|
| *F24F 13/22* | (2006.01) | |
| *F24F 1/0047* | (2019.01) | |
| *F24F 1/0007* | (2019.01) | |
| *F16L 37/04* | (2006.01) | |
| *F24F 1/0022* | (2019.01) | |
| *F24F 1/0059* | (2019.01) | |

(52) U.S. Cl.
CPC ............ *F24F 13/222* (2013.01); *F16L 37/04* (2013.01); *F24F 1/0007* (2013.01); *F24F 1/0022* (2013.01); *F24F 1/0047* (2019.02); *F24F 1/0059* (2013.01); *F24F 2013/227* (2013.01)

(58) Field of Classification Search
CPC ...... F24F 13/222; F24F 1/0047; F24F 1/0022; F24F 1/0059; F24F 1/0007; F24F 2013/227; F16L 37/04
USPC .......................................... 62/291
See application file for complete search history.

(56) References Cited

U.S. PATENT DOCUMENTS

| | | | | |
|---|---|---|---|---|
| 10,107,519 | B2 * | 10/2018 | Yang ..................... | F24F 1/0059 |
| 2009/0064698 | A1 * | 3/2009 | Spanger ................ | F24F 13/222 |
| | | | | 62/280 |
| 2009/0084127 | A1 * | 4/2009 | Nakata .................. | F24F 1/0007 |
| | | | | 62/291 |
| 2011/0016904 | A1 * | 1/2011 | Yoon ..................... | F24F 3/1405 |
| | | | | 62/285 |
| 2011/0278234 | A1 * | 11/2011 | Willett .................. | B01D 17/00 |
| | | | | 210/744 |

(Continued)

FOREIGN PATENT DOCUMENTS

| | | | | | |
|---|---|---|---|---|---|
| JP | 2002243197 | | * | 2/2001 | |
| JP | 2006207648 | A | * | 8/2006 | |
| WO | WO-2011013446 | A1 | * | 2/2011 | ............ F24F 1/0007 |

*Primary Examiner* — Steve S Tanenbaum (57) ABSTRACT

An air conditioner including a drain hose to be injection-molded is disclosed. An air conditioner includes a main body of an indoor unit, a heat exchanger disposed in the main body of the indoor unit, and a drain hose configured to discharge condensed water generated from the heat exchanger, wherein the drain hose is disposed in the main body and is injection-molded.

14 Claims, 9 Drawing Sheets

(56) References Cited

U.S. PATENT DOCUMENTS

| | | | |
|---|---|---|---|
| 2012/0291498 A1* | 11/2012 | Park | D06F 39/083 68/212 |
| 2014/0130533 A1* | 5/2014 | Karas | B60H 1/3233 62/291 |
| 2015/0084335 A1* | 3/2015 | Farrell | F16L 19/065 285/343 |

* cited by examiner

DRAIN HOSE AND AIR CONDITIONER INCLUDING THE SAME

CROSS-REFERENCE TO RELATED APPLICATIONS AND CLAIM OF PRIORITY

The present application is a continuation of application Ser. No. 15/191,483, filed Jun. 23, 2016, which claims the priority to Korean Patent Application No. 10-2015-0089041, filed Jun. 23, 2015 in the Korean Intellectual Property Office, the disclosures of which are incorporated herein by reference.

BACKGROUND

1. Field

Embodiments of the present disclosure relate to an air conditioner, and more particularly, to a drain hose and an air conditioner including the same.

2. Description of Related Art

A general air conditioner is an apparatus which cools or heats an indoor space using endothermic or exothermic reaction achieved by vaporization or liquefaction of refrigerant circulating in a cooling cycle. In the cooling cycle, a compressor, a condenser, an expansion valve, an evaporator, etc. are connected through a refrigerant tube to implement a closed circuit.

Air conditioners are classified into a stand-type air conditioner in which an indoor unit is installed at a floor of an indoor space, a wall-mounted type air conditioner in which an indoor unit is installed at a wall of an indoor space, and a ceiling-type air conditioner in which an indoor unit is installed at a ceiling of an indoor space.

The indoor unit of the ceiling-type air conditioner may be embedded in the ceiling or may hang from the ceiling. The indoor unit of the ceiling-type air conditioner is installed at the ceiling, such that air inlets through which indoor air is suctioned and air outlets through which indoor air is discharged are respectively disposed at the bottom of the indoor unit. Further, a heat exchanger in which suctioned air is heat-exchanged with refrigerant to cool or heat the indoor space, and an air blower through which indoor air passes through the indoor unit and circulates the cooling cycle are installed in the indoor unit.

In addition, a drain tray configured to receive condensed water falling from the heat exchanger is disposed in the indoor unit of the ceiling-type air conditioner, and the condensed water collected in the drain tray is pumped by a drain pump and then discharged to the outside of the indoor unit through a drain hose.

In this case, after the drain hose is coupled to the drain pump, the drain hose needs to be additionally assembled using a separate fixing member such as a cable tie or clip ring so as to guarantee tensile force by increasing frictional force.

SUMMARY

Therefore, it is an aspect of the present disclosure to provide an air conditioner including a drain hose to be injection-molded.

It is another aspect of the present disclosure to provide an air conditioner in which a fixing structure of a drain hose is improved to more closely contact a counterpart, resulting in prevention of water leakage.

It is another aspect of the present disclosure to provide an air conditioner which can be injection-molded using a composite material, such that production costs and the number of fabrication processes can be greatly reduced.

Additional aspects of the present disclosure will be set forth in part in the description which follows and, in part, will be obvious from the description, or may be learned by practice of the present disclosure.

In accordance with an aspect of the present invention, an air conditioner includes: a main body of an indoor unit; a heat exchanger disposed in the main body of the indoor unit; and a drain hose configured to discharge condensed water generated from the heat exchanger wherein the drain hose is disposed in the main body and is injection-molded.

Also, the drain hose may include: a tube having a hollow; and a connection portion formed at an end of the tube, wherein the tube and the connection portion may be injection-molded in one body.

Also, the drain hose may include at least one of ethylene propylene diene monomer (EPDM) rubber and polypropylene (PP) plastic.

Also, the main body of the indoor unit may include a counterpart connected to the drain hose, wherein the counterpart may include at least one of a connection member mounted at a drain hole of the main body and a drain pump disposed in the main body.

Also, the connection portion may include a first connection portion coupled to the connection member; and a second connection portion coupled to the drain pump, wherein the first connection portion and the second connection portion may be located perpendicular to each other.

Also, the first connection portion and the tube may be injection-molded in one body.

Also, the second connection portion and the tube may be injection-molded in one body.

Also, the connection portion may be forced inserted into the counterpart.

Also, the connection portion may include: a contact increasing portion protruding in a radial direction, located at an outer end the connection portion.

Also, an inner surface of the connection portion may be deformed to correspond to a shape of the counterpart.

Also, the connection portion may have a thickness larger than a thickness of the tube.

Also, the tube may include a bending portion formed to be bent at a right angle.

Also, the drain hose may include a first drain hose configured to interconnect the drain pump and the connection member at the inside of the main body of the indoor unit; and a second drain hose connected to the connection member at the outside of the main body of the indoor unit, so as to discharge condensed water.

In accordance with another aspect of the present disclosure, an air conditioner includes: a main body of an indoor unit; a heat exchanger disposed in the main body of the indoor unit; a drain tray configured to collect condensed water generated from the heat exchanger, and discharge the collected condensed water; a drain pump disposed in the drain tray; and a drain hose connected to the drain pump, configured to discharge the condensed water to the outside, wherein the drain hose includes a tube having a hollow therein; and a connection portion formed at an end of the tube, configured to be connected to the drain pump, wherein the tube and the connection portion are injection-molded in one body.

Also, the tube may include: a bending portion formed to be bent at a right angle.

Also, the drain hose may include at least one of ethylene propylene diene monomer (EPDM) rubber and polypropylene (PP) plastic.

Also, the connection portion may be forcedly inserted into the drain pump.

Also, an inner surface of the connection portion may be deformed to correspond to a shape of the drain pump.

Also, the connection portion may include a contact increasing portion configured to increase a size of a region contacting the drain pump.

Also, the connection portion has a thickness larger than a thickness of the tube.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings, wherein like reference numerals refer to like elements throughout. The embodiments of the present disclosure can be applied to all kinds of drain hoses, each of which can be fixed to a counterpart. The counterpart may refer to a structure for water supply. Although the embodiments will exemplarily disclose that the other party is implemented as a drain pump, the scope or spirit of the present disclosure is not limited thereto. The drain hose can be applied to all kinds of hoses configured to discharge (or drain) condensed water or to supply water. Terms "front end", "rear end", "upper part," "lower part," "upper end," and "lower end" are defined based on the drawings and do not limit shapes and positions of components.

Figure 1:
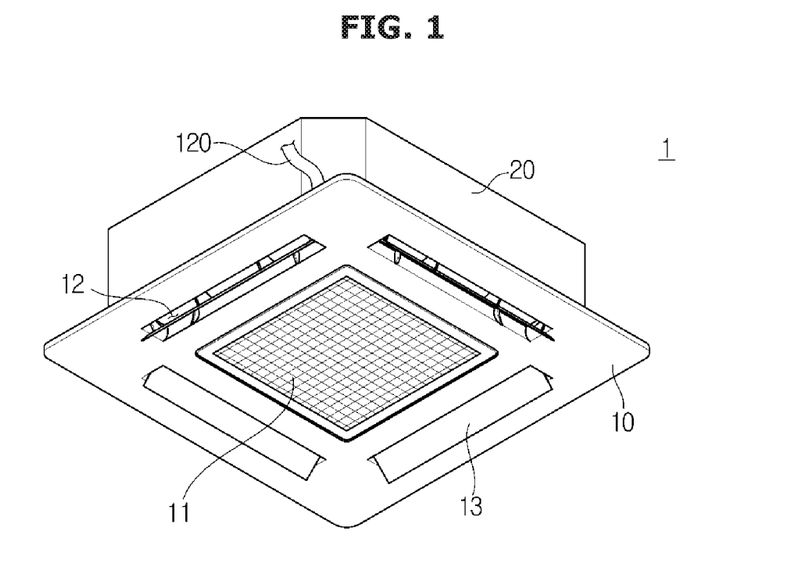
FIG. 1 is a perspective view illustrating an air conditioner according to an embodiment of the present disclosure.
Figure 2:
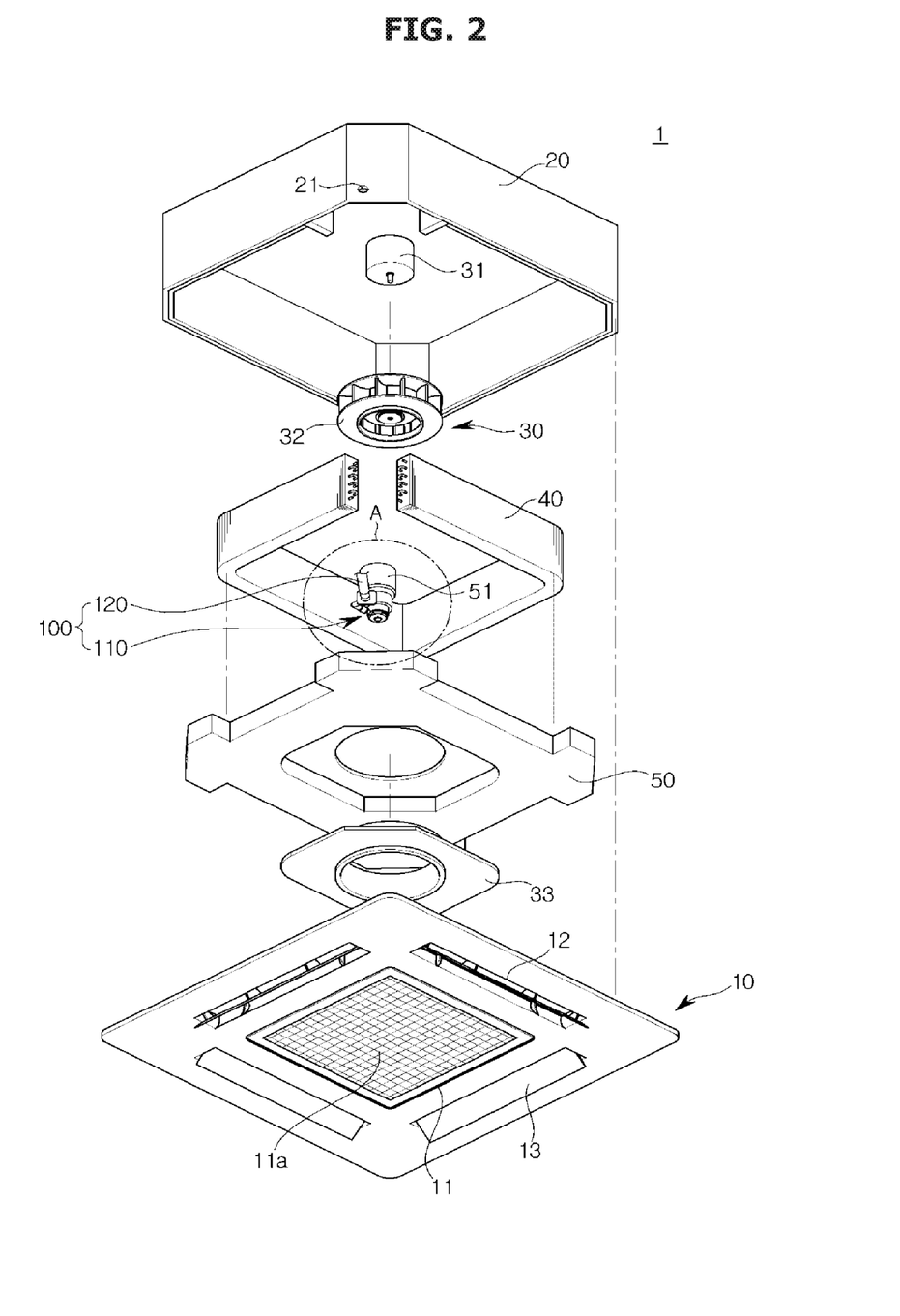
FIG. 2 is an exploded perspective view illustrating an air conditioner according to an embodiment of the present disclosure.

Referring to FIGS. 1 and 2, an upper part of a ceiling-type air conditioner 1 may be inserted in a ceiling and fixed thereto, and a lower part thereof may be installed at the ceiling such that the lower part can be partially exposed to the outside.

The ceiling-type air conditioner 1 may include an indoor-unit main body 20 provided at an upper part thereof in a manner that the indoor-unit main body 20 hangs from the ceiling or is embedded in the ceiling, and a front panel 10 coupled to a lower part of the indoor-unit main body 20.

The indoor-unit main body 20 may be formed in a box shape, one surface of which is opened. The indoor-unit main body 20 may include a heat exchanger 40 in which suctioned air exchanges heat with a refrigerant, and a blowing unit 30 through which air forcibly flows.

The blowing unit 30 may include a fan motor 31 disposed at the center part of the inside of the indoor-unit main body 20 so as to generate rotational force, and a blowing fan 32 configured to rotate by the fan motor 31 to generate suction force and blowing force such that indoor air can circulate in the indoor-unit main body 20.

The heat exchanger 40 enclosing the exterior of a radius direction of the blowing fan 32 may be disposed at the outside of the blowing fan 32, such that the heat exchanger 40 exchanges heat with air discharged from the blowing fan 32 so as to cool indoor air. Although the embodiment has exemplarily disclosed that the heat exchanger 40 is formed in an approximately square shape corresponding to the shape of the indoor-unit main body 20 and the blowing fan 32 is implemented as a centrifugal fan which suctions air in the axial direction and discharges the suctioned air toward the outside of the radial direction, the scope or spirit of the present disclosure is not limited thereto.

Although not shown in the drawings, a control device and the like to control the ceiling-type air conditioner 1 may be provided at the indoor-unit main body 20.

The front panel 10 may be installed at the lower part of the indoor-unit main body 20. The front panel 10 may be formed in a square shape corresponding to the shape of the indoor-unit main body 20. A suction unit 11 configured to suction air from the indoor space may be formed at the center part of the front panel 10 in a manner that air can pass through the suction unit 11.

The suction unit 11 may include a suction grill 11a having lattice-shaped through holes to allow indoor air to be suctioned into the indoor-unit main body 20. A filter member (not shown) to filter out impurities contained in the suctioned air may also be installed at the rear of the suction grill 11a.

In addition, a guide duct 33 configured to direct indoor air suctioned through the suction unit 11 toward the blowing fan 32 may be installed.

An outlet 12 may be formed at an outer frame of the front panel 10 such that air cooled through the heat exchanger 40 contained in the indoor-unit main body 20 can be discharged to the indoor space. A blade 13 configured to adjust the direction of discharged air may be installed at the outlet 12.

The outlet 12 may be formed at each of four edges of the front panel 10, such that four outlets 12 are formed in the front panel 10. The four outlets 12 may be arranged to discharge air in all directions of the indoor space.

Meanwhile, a drain tray 50 configured to receive condensed water generated in the cooling process of indoor air may be installed at the indoor-unit main body 20. The drain tray 50 may be formed in a top-opened box shape to receive condensed water generated from the heat exchanger 40. The drain tray 50 may be arranged below the heat exchanger 40 to collect condensed water flowing downstream along the surface of the heat exchanger 40.

The condensed water collected in the drain tray 50 may be drained to the outside of the indoor-unit main body 20 through the drain pump 51 and the drain hose 100.

Figure 3:
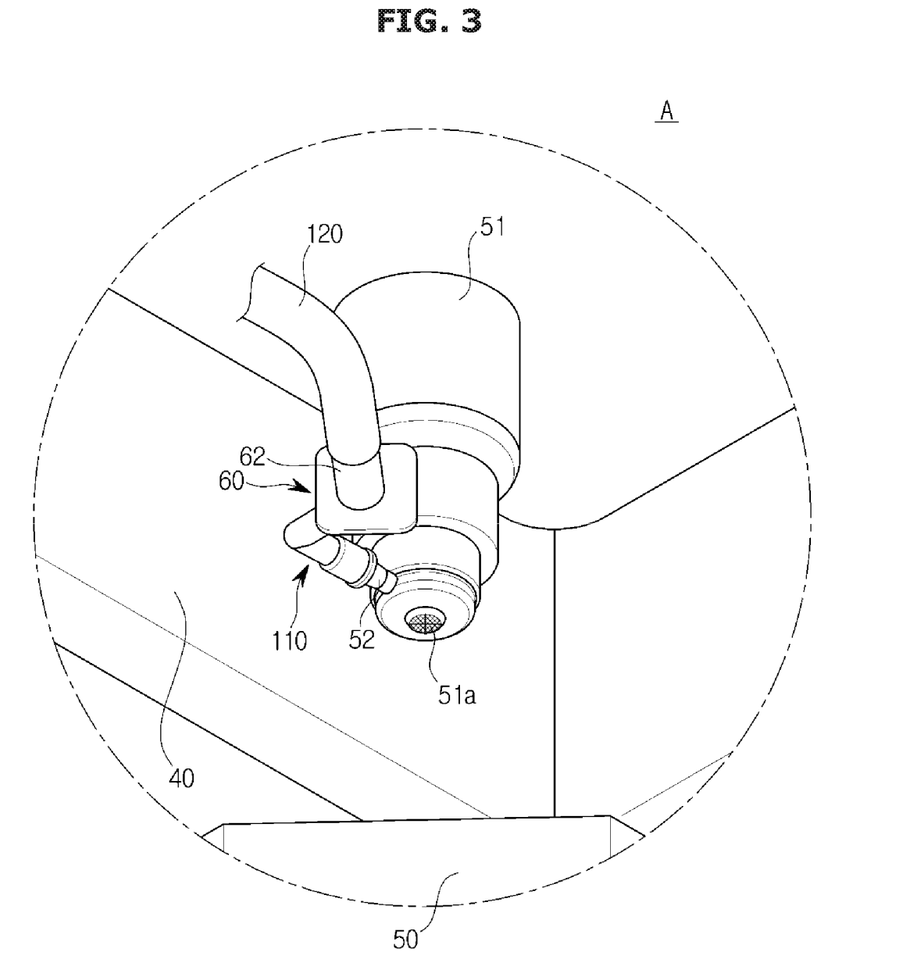
FIG. 3 is an enlarged view illustrating a portion A of FIG. 2.
Figure 4:
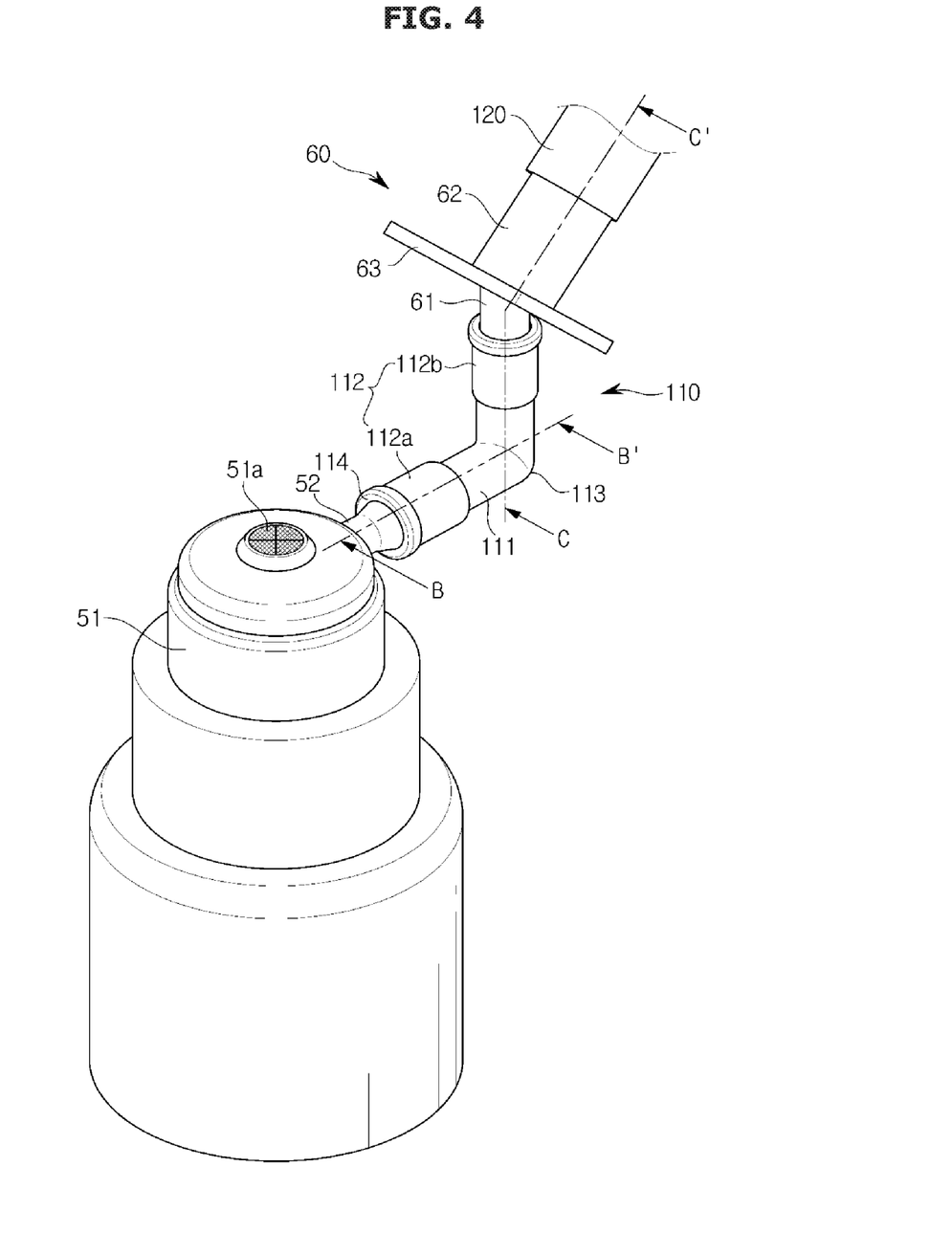
FIG. 4 is a perspective view illustrating a connection structure between a drain pump and a drain hose of the air conditioner according to an embodiment of the present disclosure.
Figure 5:
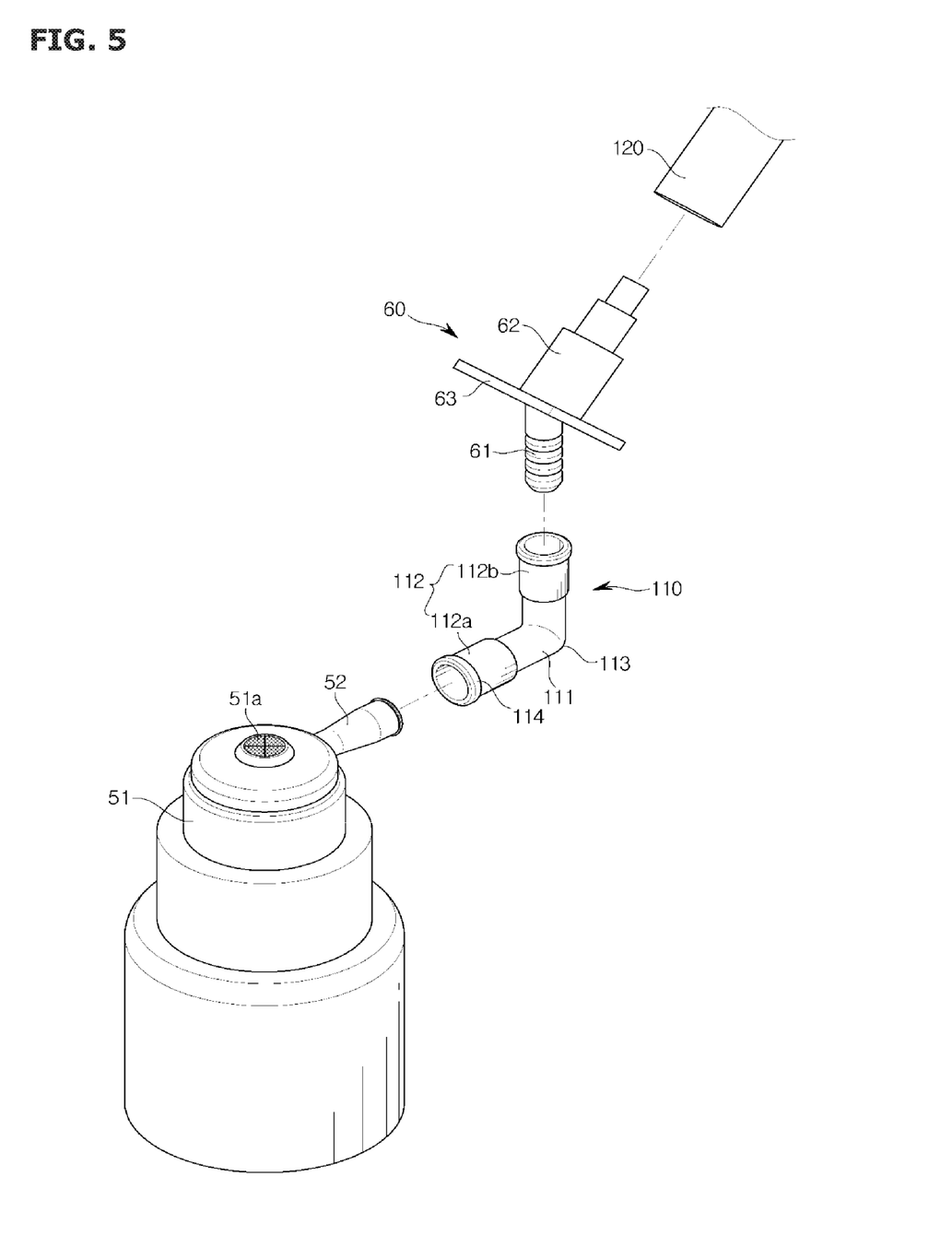
FIG. 5 is an exploded perspective view illustrating a connection structure between a drain pump and a drain hose of the air conditioner according to an embodiment of the present disclosure.

Referring to 3 to 5, the drain pump 51 configured to drain condensed water collected in the drain tray 50 may be disposed in the indoor-unit main body 20.

The drain pump 51 may be installed at one side of the drain tray 50 such that condensed water collected in the drain tray 50 can be suctioned through an inlet 51a of the drain tray 50 and the suctioned water is then discharged.

The inlet 51a of the drain pump 51 may be formed at the bottom of the drain pump 51, and may be located closest to the drain tray 50.

In addition, condensed water forcibly suctioned from the drain pump 51 may be drained outside from the indoor-unit main body 20 through the drain hose 100.

The drain hose 100 may include a first drain hose 110 connected to the drain pump 51 at the inside of the indoor-unit main body 20, and a second drain hose 120 connected to the first drain hose 110 at the outside of the indoor-unit main body 20 so as to drain condensed water to the outside of the indoor-unit main body 20.

The first drain hose 110 may be connected to a counterpart at the inside of the indoor-unit main body 20. Although the embodiment has exemplarily disclosed that the counterpart is any of a drain pump and a connection member, the scope or spirit of the present disclosure is not limited thereto. For example, the first drain hose may also be connected to a check valve provided to prevent backflow of condensed water. The check valve may also be installed in the first drain hose.

The first drain hose 110 provided in the indoor-unit main body 20 may be installed to connect the drain pump 51 to the connection member 60.

The connection member 60 may be configured to interconnect the first drain hose 110 and the second drain hose 120. The connection member 60 is installed in the indoor-unit main body 20 to allow the inside of the indoor-unit main body 20 to communicate with the outside of the indoor-unit main body 20, such that condensed water is drained from the inside to the outside of the indoor-unit main body 20.

The indoor-unit main body 20 is provided in at least one surface thereof with an installation hole 21 through which the connection member is installed. Although the embodiment has exemplarily disclosed that the installation hole 21 is formed in a shape corresponding to a diameter of the second drain hose 120, the scope or spirit of the present disclosure is not limited thereto. For example, the installation hole 21 formed in the indoor-unit main body 20 may be formed in size and shape corresponding to those of the connection member 60, such that the connection member 60 is installed while passing through the installation hole 21.

The first drain hose 110 may be configured to interconnect the drain pump 51 and the connection member 60 at the inside of the indoor-unit main body 20.

The drain pump 51 may include a drain hose connection portion 52 formed to protrude such that the first drain hose 110 is connected to the drain hose connection portion 52. The drain hose connection portion 52 may be arranged in the vicinity of the inlet 51a. The drain hose connection portion 52 may be formed in a tube shape having a predetermined diameter such that condensed water forcibly pumped through the inlet 51a of the drain pump 51 may flow therein.

The connection member 60 may include a support bracket 63 provided at the center part thereof, a first connection tube 61 formed to protrude at one side of the support bracket 63, and a second connection tube 62 formed to protrude at the other side of the support bracket 63. The first connection tube 61, the second connection tube 62, and the support bracket 63 may be formed to communicate with one another.

The first drain hose 110 may be connected to the first connection tube 61 of the connection member 60.

The second connection tube 62 of the connection member 60 may be formed to pass through the installation hole 21 of the indoor-unit main body 20. Therefore, the second connection tube 62 may protrude outward from the indoor-unit main body 20. The second drain hose 120 may be connected to the second connection tube 62.

The second drain hose 120 may be connected to the second connection tube 62 of the connection member 60 at the outside of the indoor-unit main body 20. The second drain hose 120 may be formed in a tube shape through which condensed water flows such that the condensed water can be drained outside.

The support bracket 63 of the connection member 60 may be formed in a plate shape in a manner that the support bracket 63 can be supported and fixed to a peripheral lateral surface of the installation hole 21 of the indoor-unit main body 20. By the plate-shaped support bracket 83, the connection member 60 can be stably fixed to the indoor-unit main body 20.

By the connection member 60 disposed in the indoor-unit main body 20, the first drain hose 110 may be disposed in the indoor-unit main body 20, and the second drain hose 120 may be disposed outside of the indoor-unit main body 20.

Figure 6:
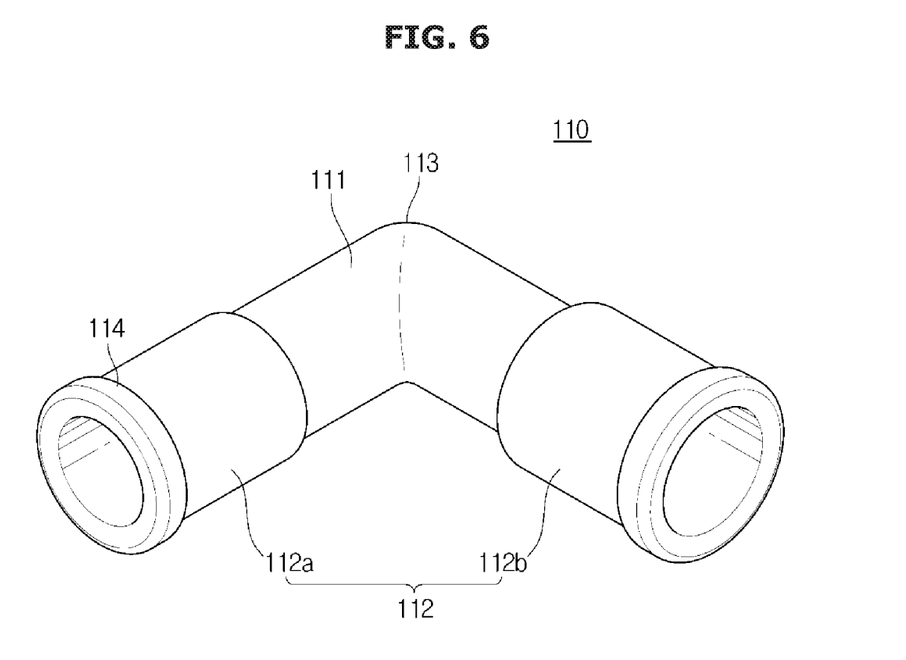
FIG. 6 is a perspective view illustrating a drain hose according to an embodiment of the present disclosure.
Figure 7:
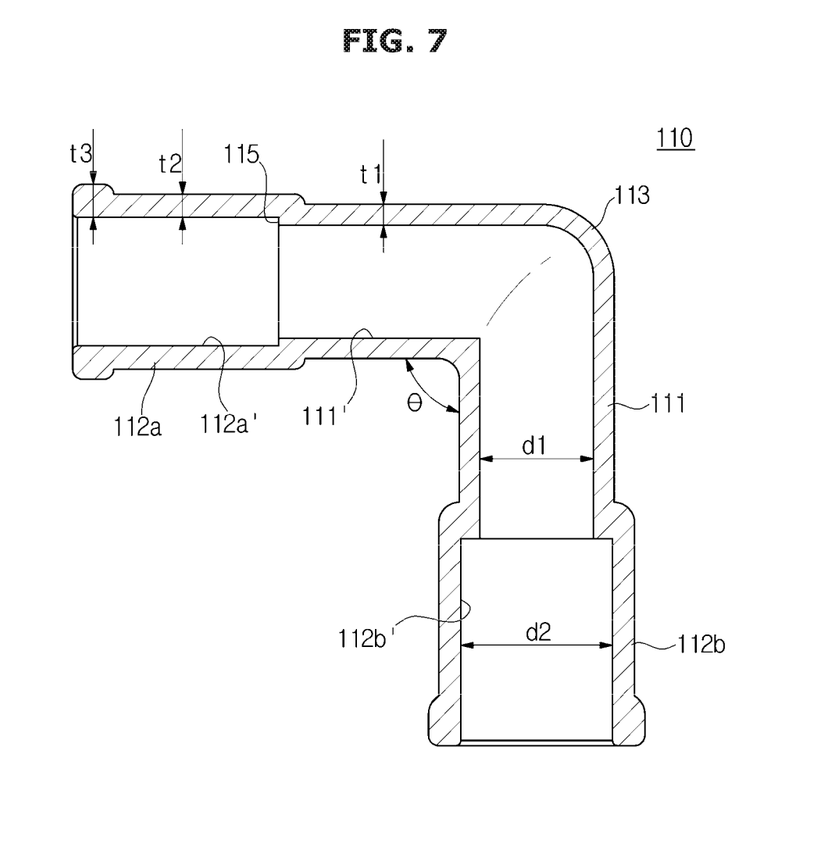
FIG. 7 is a cross-sectional view illustrating a drain hose according to an embodiment of the present disclosure.

Referring to FIGS. 6 and 7, the first drain hose 110 may be formed in the shape of a hollow tube.

The first drain hose 110 may include a tube 111 having a hollow and a connection portion 112 formed at the end of the tube 111. The first drain hose 110 may be injection-molded. The first drain hose 110 may be of at least one of ethylene propylene diene monomer (EPDM) rubber and polypropylene (PP) plastic through injection-molding. The first drain hose 110 may be formed of a composite material corresponding to a mixture of EPDM rubber and PP plastic through injection-molding.

The tube 111 and the connection portion 112 of the first drain hose 110 may be injection-molded in one body. The tube 111 of the first drain hose 110 may include a bending portion 113 formed to be bent at a right angle.

Therefore, the first drain hose 110 may be bent at a right angle so that the first drain hose 110 may be formed in an approximate '¬' shape. Although the embodiment has exemplarily disclosed that the bending portion 113 of the first drain hose 110 is bent at a right angle, the scope or spirit of the present disclosure is not limited thereto. For example, the bending portion may be formed at a first angle (θ).

The first connection portion 112a and the second connection portion 112b may be arranged perpendicular to each other with respect to the bending portion 113 of the first drain hose 110.

Since the first drain hose 110 is formed through injection molding, the first drain hose 110 may be fabricated in a complex shape.

A first diameter (d1) of the tube 111 of the first drain hose 110 may be smaller in size than the second diameter (d2) of the connection portion 112. In this way, the second diameter (d2) of the connection portion 112 is larger than the first diameter (d1) of the tube 111, such that the counterpart inserted through the connection portion 112 contacts the first diameter (d1) of the tube 111, resulting in increased adhesion between the first drain hose 110 and the counterpart.

The connection portion 112 of the first drain hose 110 may include a connection-portion inner surface 112' formed on an inner circumferential surface of the connection portion 112, and the tube 111 includes a tube inner surface 111' formed on an inner circumferential surface of the tube 111.

The connection-portion inner surface 112' of the connection portion 112 may include an inner surface 112a' of the first connection portion 112a and an inner surface 112b' of the second connection portion 112b.

A step-shaped portion 115 may be formed between the first diameter (d1) of the tube 111 and the second diameter (d2) of the connection portion 112 by a difference between the first diameter (d1) and the second diameter (d2). The step-shaped portion 115 may be formed in the vicinity of a connection portion between the connection-portion inner surface 112' and the tube inner surface 111'.

The counterpart may contact the step-shaped portion 115 in the first drain hose 110 so as to be combined with the step-shaped portion 115.

Therefore, the first drain hose 110 can be more stably combined with the above-mentioned counterpart to be coupled thereto, resulting in prevention of water leakage.

In addition, a first thickness (t1) of the tube 111 of the first drain hose 110 may be smaller than a second thickness (t2) of the connection portion 112. The first thickness (t1) of the tube 111 and the second thickness (t2) of the connection portion 112 may be changed in various ways according to the external appearance of a counterpart to be coupled to the first drain hose 110.

The connection portion 112 of the first drain hose 110 may be forcedly inserted into the counterpart.

The connection-portion inner surface 112' of the connection portion 112 may be deformed to correspond to the shape of the counterpart.

In addition, a contact increasing portion 114 formed to protrude in the radial direction may be provided at the end of the connection portion 112. The contact increasing portion 114 may be formed at one side and the other side of the connection portion 112, and may be formed to have a third thickness (t3) larger than the second thickness (t2) of the connection portion 112. Although the embodiment has exemplarily disclosed that the contact increasing portion 114 is formed to protrude from the circumferences of both ends of the connection portion 112 by a predetermined thickness, the scope or spirit of the present disclosure is not limited thereto. For example, two or more contact increasing portions may also be formed at the end of the connection portion while being spaced apart from each other by a predetermined distance.

Figure 8:
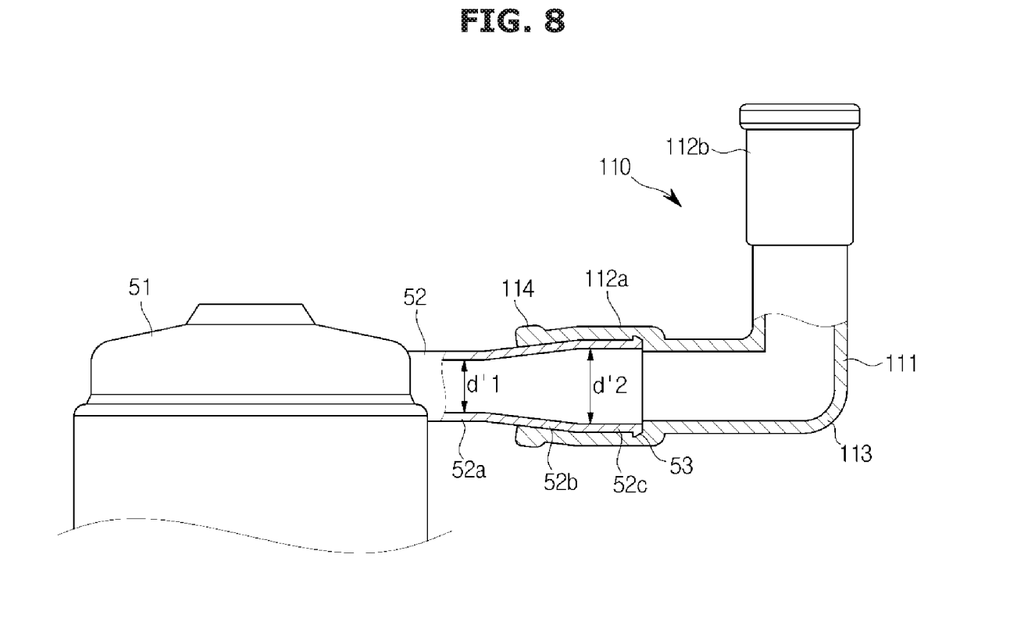
FIG. 8 is an enlarged view illustrating the connection structure taken along the line B-B' of FIG. 4.
Figure 9:
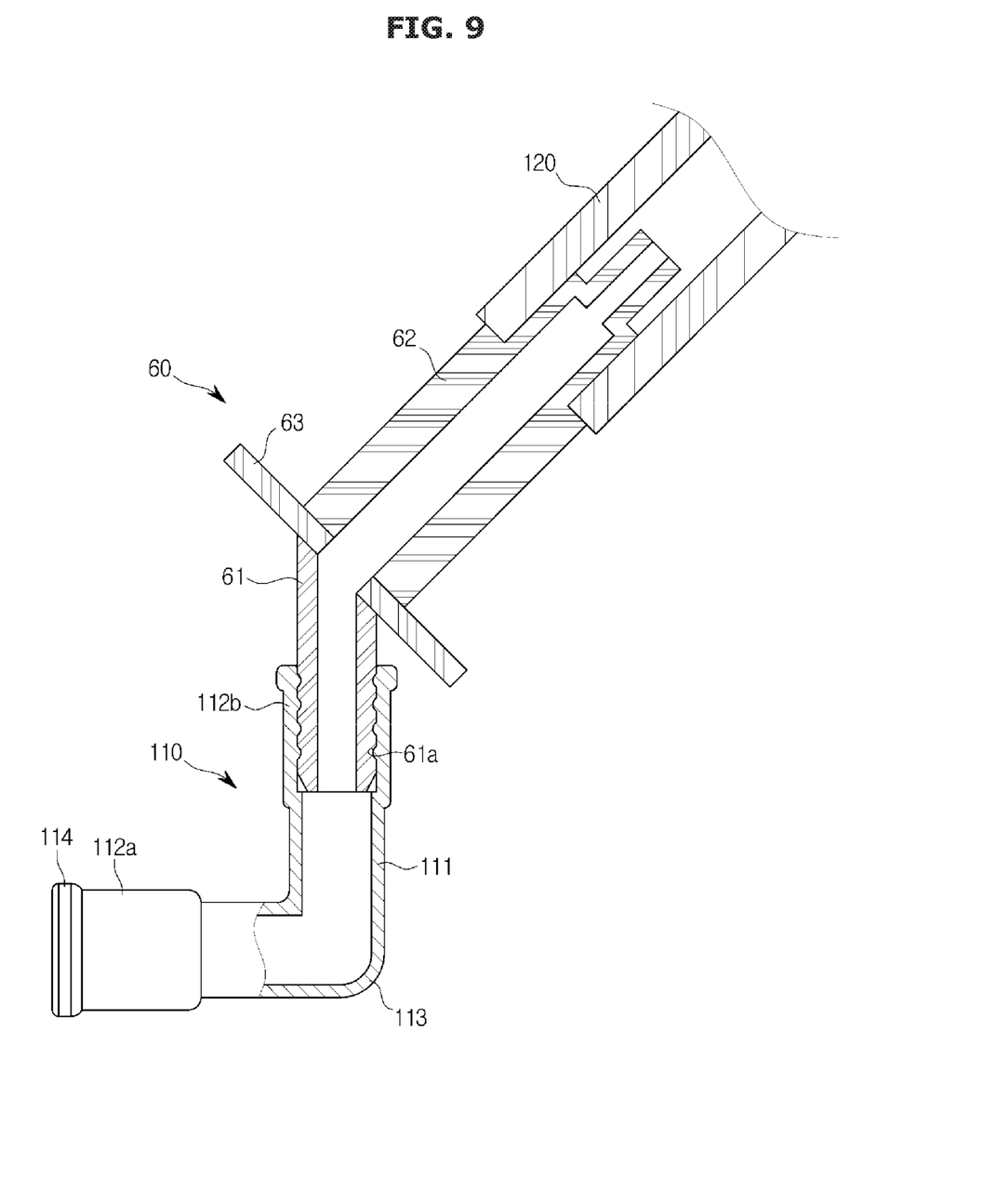
FIG. 9 is an enlarged view illustrating the connection structure taken along the line C-C' of FIG. 4.

FIGS. 8 and 9 are views illustrating an assembled state among the first drain hose, the drain pump and the connection member.

Referring to the first drain hose 110 of FIGS. 8 and 9, the first connection portion 112a of the drain pump 51 may be connected to the drain hose connection portion 52.

The drain pump 51 may include a drain hose connection portion 52 protruded to be connected to the first drain hose 110. The drain hose connection portion 52 may be configured in the form of a tube protruding toward one side of the drain pump 51. The drain hose connection portion 52 may include a first tube 52a having a first diameter (d'1), a third tube 52c having a second diameter (d'2), and a second tube 52b configured to interconnect the first tube 52a and the third tube 52c. The first diameter (d'1) may be smaller than the second diameter (d'2). The second tube 52b may connect the first tube 52a to the third tube 52c, and a diameter of the second tube 52b may have a tilted plane, the size of which gradually increases from the first diameter (d1) to the second diameter (d2).

In the first drain hose 110, the first connection portion 112a may be injection-molded in a predetermined shape corresponding to the shape of the drain hose connection portion 52. The first connection portion 112a of the first drain hose 110 may be inserted into the drain hose connection portion 52, such that the inner surface 112a' of the first connection portion 112a can be closely assembled to the second tube 52b and the third tube 52c of the drain hose connection portion 52.

In this case, the contact increasing portion 114 of the first connection portion 112a closely contacts the tilted plane of the second tube 52b, resulting in increased coupling force between the first drain hose 110 and the drain hose connection portion 52.

In addition, a protrusion portion 53 protruding outward may be formed at the end of the drain hose connection portion 52. The protrusion portion 53 contacts the step-shaped portion 115 of the first drain hose 110, deforms some part of the connection portion inner surface 112', the tube inner surface 111', and the step-shaped portion 115, and thus increases frictional force.

The second connection portion 112b of the first drain hose 110 may be connected to the connection member 60.

The connection member 60 may include a first connection tube 61 disposed at one side of the support bracket 63 and a second connection tube 62 disposed at the other side of the support bracket 63. The first connection tube 61, the second connection tube 62, and the support bracket 63 may be formed to communicate with one another.

A connection groove 61a recessed to increase coupling force may be formed at the outer circumferential surface of the first connection tube 61.

The second connection portion 112b of the first drain hose 110 may be inserted into the first connection tube 61 of the connection member 60. The second connection portion 112b of the first drain hose 110 may be forcedly inserted into the first connection tube 61.

In this case, the inner surface 112b' of the second connection portion 112b of the first drain hose 110 may be deformed such that a coupling protrusion is formed to have a shape corresponding to the shape of the coupling groove 61a.

Therefore, the second connection portion 112b of the first drain hose 110 may more closely contact the first connection tube 61 of the connection member 60, resulting in an increase of the frictional force and the coupling force.

The increased coupling force between the first drain hose 110 and the counterpart including the drain pump 51 and the connection member 60 may prevent water leakage of the first drain hose 110, thereby increasing the quality of products.

As is apparent from the above description, the air conditioner according to embodiments of the present disclosure can improve dimensional accuracy by injection-molding a drain hose formed of a composite material, resulting in improved product quality.

The air conditioner according to embodiments of the present disclosure can more closely contact a counterpart by improving a fixing structure of a drain hose, and can improve product durability by preventing water leakage.

The air conditioner according to embodiments of the present disclosure can reduce product costs based on injection-molding and can also reduce an overall fabrication time needed to manufacture products.

Although a few embodiments of the present disclosure have been shown and described, it would be appreciated by those skilled in the art that changes may be made in these embodiments without departing from the principles and spirit of the present disclosure, the scope of which is defined in the claims and their equivalents.

What is claimed is:

1. An air conditioner comprising:
a main body of an indoor unit that hangs from a ceiling or is embedded in the ceiling, wherein the main body includes a counterpart that includes at least one of a connection member mounted at a drain hole of the main body and a drain pump disposed in the main body;
a heat exchanger disposed in the main body of the indoor unit;
the drain pump configured to drain condensed water generated from the heat exchanger; and
a drain hose including a connection portion connected to the drain pump for discharging the condensed water generated from the heat exchanger, wherein an inner surface of the connection portion includes a step-shaped portion for contacting the counterpart, wherein the drain hose includes:
a first drain hose configured to interconnect the drain pump and the connection member at an inside of the main body of the indoor unit, the first drain hose including:
a tube having a hollow, and
the connection portion formed at an end of the tube, wherein the connection portion includes:
a first connection portion coupled to the connection member,
a second connection portion coupled to the drain pump, and
a contact increasing portion protruding in a radial direction, located at an outer end of the connection portion, and
a second drain hose connected to the connection member at an outside of the main body of the indoor unit so as to discharge condensed water,
wherein the first connection portion and the second connection portion are located perpendicular to each other,
wherein the tube and one of the first and second connection portions are injection-molded into one body,
wherein the drain hose is disposed in the main body and is injection-molded and formed of a material including a mixture of rubber and plastic, and
wherein the counterpart is connected to the drain hose.

2. The air conditioner according to claim 1, wherein the drain pump includes a drain hose connection portion having a horn shape.

3. The air conditioner according to claim 1, wherein the first connection portion and the tube are injection-molded in one body.

4. The air conditioner according to claim 1, wherein the second connection portion and the tube are injection-molded in one body.

5. The air conditioner according to claim 1, wherein the connection portion is forcibly inserted onto the counterpart.

6. The air conditioner according to claim 1, wherein an inner surface of the connection portion is deformed to correspond to a shape of the counterpart.

7. The air conditioner according to claim 1, wherein the connection portion has a thickness larger than a thickness of the tube.

8. The air conditioner according to claim 1, wherein the tube includes a bending portion formed to be bent at a right angle.

9. An air conditioner comprising:
a main body of an indoor unit that hangs from a ceiling or is embedded in the ceiling;
a heat exchanger disposed in the main body of the indoor unit;
a drain tray configured to collect condensed water generated from the heat exchanger, and discharge the collected condensed water;
a drain pump disposed in the drain tray; and
a drain hose connected to the drain pump, configured to discharge the condensed water to an outside of the main body,
wherein the drain hose includes:
a first drain hose configured to interconnect the drain pump and a connection member at an inside of the main body of the indoor unit, the first drain hose including:
a tube having a hollow therein, and
a connection portion formed at an end of the tube, configured to be connected to the drain pump, wherein an inner surface of the connection portion includes a step-shaped portion for contacting a counterpart, and
a second drain hose connected to the connection member at the outside of the main body of the indoor unit so as to discharge condensed water,
wherein the drain hose is disposed in the main body and is injection-molded and formed of a material including a mixture of rubber and plastic, and
wherein the connection portion includes a contact increasing portion configured to increase a size of a region contacting the drain pump.

10. The air conditioner according to claim 9, wherein the tube includes a bending portion formed to be bent at a right angle.

11. The air conditioner according to claim 9, wherein the drain pump includes drain hose connection portion having a horn shape.

12. The air conditioner according to claim 9, wherein the connection portion is forcibly inserted onto the drain pump.

13. The air conditioner according to claim 9, wherein an inner surface of the connection portion is deformed to correspond to a shape of the drain pump.

14. The air conditioner according to claim 9, wherein the connection portion has a thickness larger than a thickness of the tube.

* * * * *